March 22, 1932. S. SCHIFF 1,850,637
DOUGH ELEVATOR MECHANISM
Filed Aug. 31, 1926 2 Sheets-Sheet 2

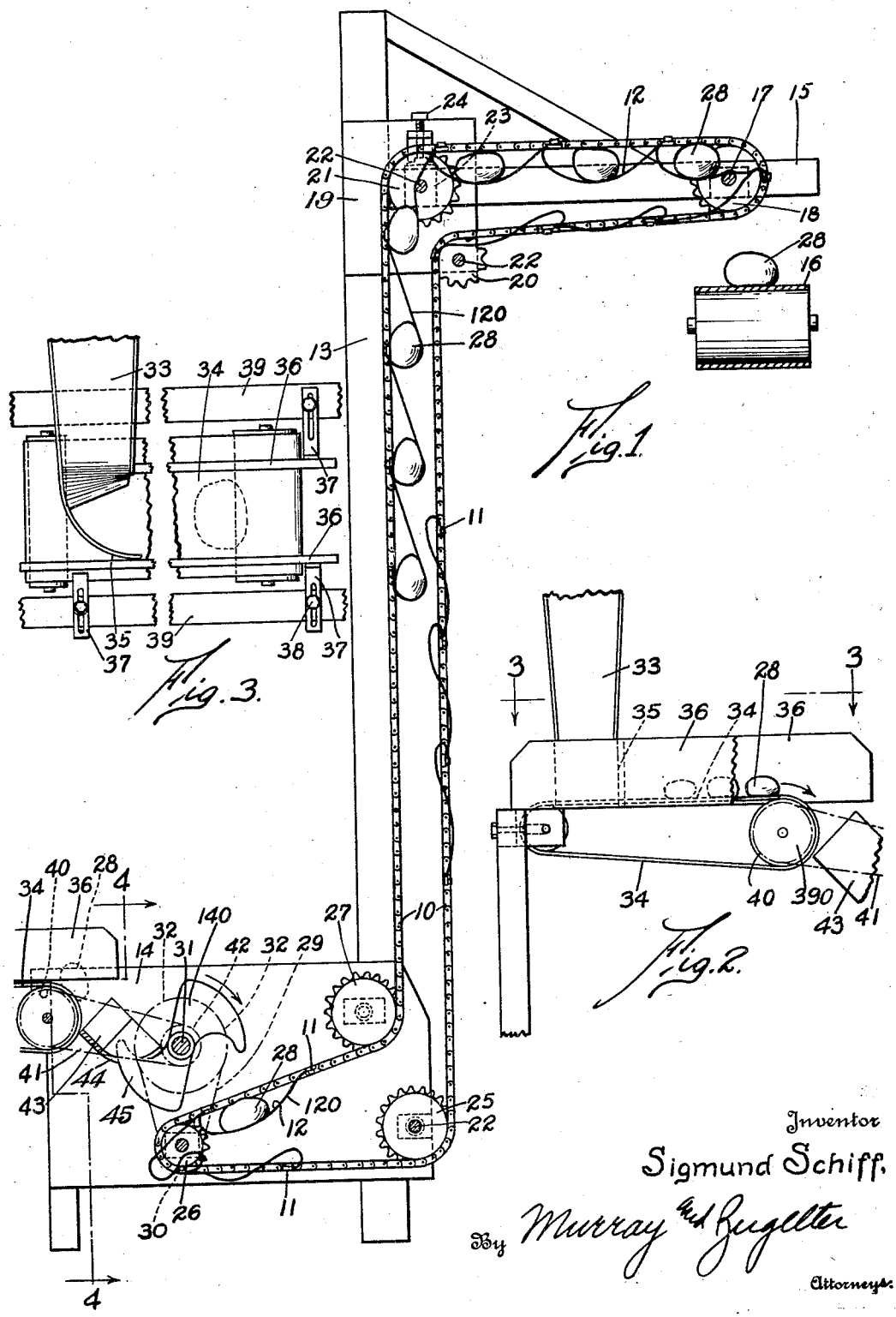
March 22, 1932.  S. SCHIFF  1,850,637
DOUGH ELEVATOR MECHANISM
Filed Aug. 31, 1926  2 Sheets-Sheet 1
Inventor
Sigmund Schiff.

Inventor
Sigmund Schiff,
By Murray & Gugelter
Attorneys

Patented Mar. 22, 1932

1,850,637

UNITED STATES PATENT OFFICE

SIGMUND SCHIFF, OF CINCINNATI, OHIO, ASSIGNOR TO THE J. H. DAY COMPANY, OF CINCINNATI, OHIO, A CORPORATION OF OHIO

DOUGH ELEVATOR MECHANISM

Application filed August 31, 1926. Serial No. 132,795.

This invention relates to dough elevators, and has for an object the provision of a device in which the advantages of space saving, positive movement and spacing of lumps of dough, and accurate directional discharge thereof are combined.

Another object is to provide a device of the character described which is simple of construction and which may be readily synchronized in its movement with its intake mechanism and a dough proofer.

Another object is to provide in combination a spacer for lumps of dough, a timing and loading mechanism and a loop elevator for the lumps, said devices being arranged to rectify the inherent errors found in practice.

Another object is to provide a dough elevator in which lumps of dough are carried without alteration of shape and without danger of having them stick to the conveying means.

These and other objects are attained by the means described herein and disclosed in the accompanying drawings, in which:

Fig. 1 is a side elevational view of my invention having associated therewith at its opposite ends, a spacing and intake and timing mechanism and a proofer conveyor.

Fig. 2 is a side elevational view of a spacing device, a fragment of which is shown at the left of Fig. 1.

Fig. 3 is a view taken on line 3—3 of Fig. 2, part being broken away.

Figure 4:
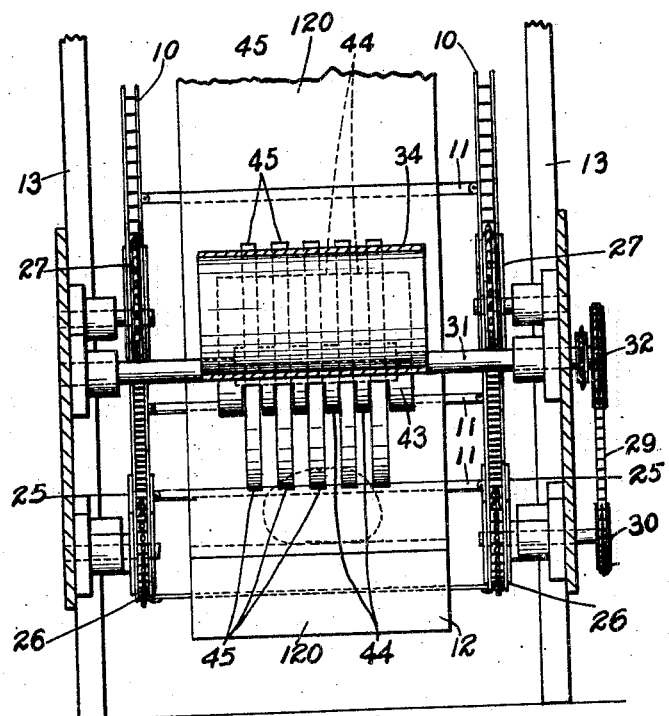
Fig. 4 is a cross-sectional view taken on line 4—4 of Fig. 1.
Figures 5, 6, 7:
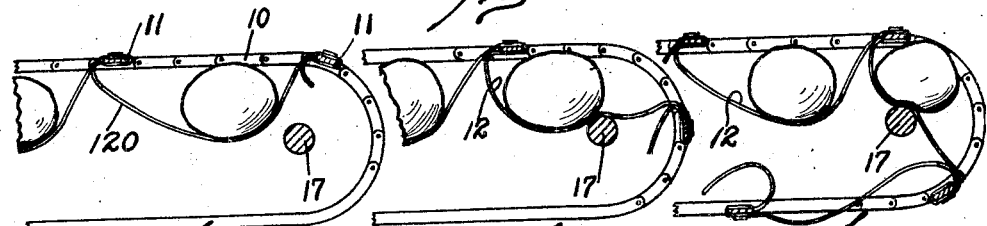
Figs. 5, 6 and 7 represent diagrammatically the movement of a lump of dough at the discharge end of the device.
Figure 8:
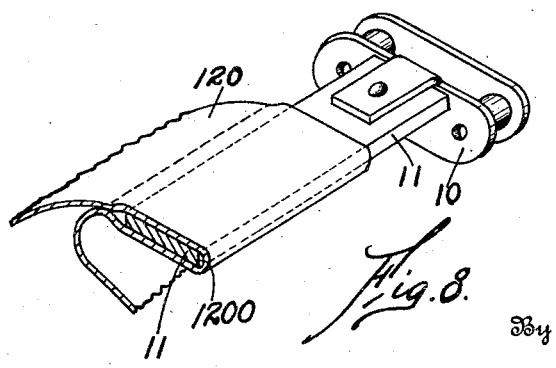
Fig. 8 is a fragmental perspective view of a detail forming part of my invention.

The device of my invention comprises a dough elevator by means of which lumps of dough are carried in spaced relation and accurately discharged in the same relation, such elevator being combined with a suitable spacing and timing means for insuring proper intake of dough by the pockets of the elevator.

The device comprises a pair of spaced endless chains, 10, connected at predetermined intervals by flat rods 11, between which are disposed pockets or loops 12 of suitable flexible material, such as canvas. These pockets or loops 12 are formed in the present device by utilizing an endless belt 120 folded upon itself at intervals and secured by stitching or in any suitable manner, to form transverse tubular sheaths 1200 within which the flat rods 11 fit very snugly. This structure is movable as a unit and is carried by suitable pairs of sprockets over which the chains pass and are directed through their required path of travel.

In the present embodiment a pair of vertical uprights 13 are positioned adjacent a loading mechanism, indicated generally as 14. At the top of the uprights 13 are cross arms 15 which terminate immediately above a conveying mechanism 16, such as a belt of a proofer. A shaft 17 is journalled at its opposite ends on cross arms 15 above conveyor 16 and has fixed thereon a pair of sprockets 18. At the junction of each cross arm 15 and its upright support 13 is a plate 19 which has revolubly mounted thereon sprockets 20 and 21.

The sprockets 21 carry chains 10 to sprocket 18 and sprockets 20 support the return reaches of chain from the sprocket 18. The sprockets 21 are freely revoluble upon a suitable shaft 22 mounted on slidable bearings 23 which are adjustably positioned by suitable screws 24 for tightening the chains.

Adjacent the bases of uprights 13 are sprockets 25 freely revolving on a shaft or a pair of studs 22 which are offset from sprockets 20, so that the downward reach of chains 10 extends vertically between them.

A pair of sprockets 26, horizontally spaced from sprockets 25, lead chains 10 and the pockets 12 carried thereby, below the intake mechanism 14, and to sprockets 27, beneath which the chains pass on an upward vertical path to the sprocket 21. As shown in Fig. 1, lumps of dough 28 are delivered at regular intervals from the intake mechanism 14, which is arranged for synchronized movement with chains 10 and loops or pockets 12 so that a lump of dough will be deposited in each pocket as it passes through the discharge mechanism 140 of loader 14. The particular mounting of the pockets on flat rods 11 prevents the pockets from turning inside out, thereby assuring the proper deposit of the lumps of dough therein. As the chains carrying loaded pockets 12, pass from their transverse line of travel between sprockets 26 and 27, to the upward vertical reach between sprocket 27 and 21, the dough rolls to the lowermost or rear end of such pockets and is then carried to its height, after which the chains again travel through a transverse horizontal path. At this time the dough rolls to the center of pocket 12 until such pocket touches shaft 17, which extends traversely in the path of the pockets. The flexible material of pocket 12, as it is drawn over the top of shaft 17, causes the lumps of dough 28 to again roll rearwardly of the pocket until the dough itself is raised over the shaft.

During this time the rearmost rod 11 of the pocket is moved over the dough so that the operative size of the pocket is reduced to the end that the lump of dough is snugly retained therein until the entire body of the lump of dough has passed over the shaft.

The pocket 12 is now inverted so that the dough 28 drops vertically onto conveyor 16. The discharge onto conveyor 16 is absolutely directional and definite so that the heretofore necessary guide chutes and spacing mechanisms are eliminated. The conveyor 16 may therefore be disposed immediately beneath the cross arms 15 so that much valuable space is saved. It should be noted that if desired the top horizontal reach of chain 10 may run immediately beneath the ceiling of the room. This is possible because the path of travel of the pockets or loops 12 is below the level of chain 10.

The series of pockets of the device of my invention may be synchronously driven from a revolving part of the intake mechanism 14. As shown in Fig. 4, drive chain 29 actuates drive sprocket 30, which is rigidly secured to the shaft carrying one of the sprockets 26. An extended shaft 31 on intake device 14 carries a sprocket 32, which actuates drive chain 29.

Because of the definite spacing of pockets 12 and uniform rate of travel thereof, it is desirable that both a spacing and a timing device be used in loading the pockets. These devices are synchronized with the elevator and may be driven from a common source of power.

The spacing device, as best shown in Figs. 2 and 3, consists of an inclined chute 33, which receives the lumps of dough 28 from a baller or rounder (not shown) and directs them to an endless conveyor belt 34, which travels transversely to the lower end of the chute and at such speed as to position each lump of dough touching the next lump on the belt. A curved vertical guide 35 directs the dough from chute 33 onto the belt, where the dough lumps are positioned in line by means of a pair of adjustable, spaced side walls 36. The side walls 36 may be secured to slotted angle brackets 37, which are retained in adjusted positions by fastening screws 38 carried by side supports 39.

The belt 34 passes around its actuating roller or pulley 390, which has a suitable sprocket 40 fixed thereto. A chain 41 passes about sprocket 40 and sprocket 42 which is fixed to shaft 31 of the timing loader. A short inclined basket 43 receives lumps of dough as they drop from spacer belt 34 and deposits them upon a series of curved spaced fingers 44 between which pass the curved rotating fingers 45 of the timer, which pick up lumps of dough from fingers 44 of the basket and deliver said lumps at regular intervals into the pockets 12.

From the foregoing it will be noted that, as the pockets 12 pass beneath the loader 140, the moving fingers 45 pick up lumps of dough 28 and drop them into said pockets, while succeeding lumps are approaching in uniform relation on the belt 34. In this way there is avoided the possibility of having two lumps of dough on the fingers 44 at the same time, and consequently, there is eliminated the danger of forming what is known in the art as "doubles". It will be noted that in this way there is also eliminated the possibility of the fingers 45 digging into the lump of dough following the one which it picks up.

The operation of the device is as follows: Lumps of dough are discharged from a rounder (not shown) onto chute 33, down which the lumps 28 slide to belt 34. The curved members 35 and sidewalls 36 accurately position the lumps, which are conveyed at a uniform rate of travel by belt 34. The lumps 28 are carried over the roller or pulley 390 and drop into basket 43, from which they ride onto the curved fingers 44, where they are picked up singly and dropped at regular intervals into pockets 12. The elevating pockets 12 travel synchronously with the intake so that each succeeding loaf is deposited in a succeeding pocket 12. The discharge at the top of the elevator is hereinbefore fully described.

The simplicity of structure and the space saving accomplished in its use in a train of dough working and baking machinery are very advantageous.

The positive directional discharge structure effects a great saving of space and eliminates the need for the ordinary receiving or guide chute.

The rolling of the lumps of dough prevents any sticking in the pockets at the place of discharge, so that perfect spacing is had to position the lumps on the proofer belt 16.

What I claim is:

1. In a dough elevator, the combination of an endless series of flexible pockets for receiving lumps of dough, a dough spacing means, means for picking up single lumps of dough at regular spaced intervals and successively depositing them directly into successive pockets, and means for effecting synchronized movement of the depositing means and the pockets.

2. In a dough elevator, the combination of an endless series of flexible pockets for carrying the lumps of dough, means for moving the pockets through an intake reach, an elevating reach, and a discharge reach and means for retaining said lumps of dough in the pockets for a predetermined interval of movement at the end of the discharge reach for effecting definite, spaced and vertical directional discharge of the dough from said pockets.

3. In a dough elevator, the combination of an intake, a conveyor operating at an elevation above the intake, an elevator comprising an endless series of flexible pockets adapted to receive articles from the intake and to carry them to a point above the conveyor, a means in the path of the pockets and above the conveyor providing an abutment for the pockets and altering the shape thereof, whereby such articles are retained in the pockets during inversion thereof for effecting dropping of the articles directly on the conveyor.

4. In an elevating mechanism, the combination of a pair of spacer endless chains arranged for unitary movement and supporting between them a series of flexible pockets for receiving lumps of dough, means comprising supporting sprockets whereby the pockets are directed through a lower transverse reach for receiving lumps of dough, then through an upward reach, then through a second transverse reach and means disposed adjacent the end of the last mentioned reach and over which the pockets must ride for retaining the dough in the pockets for the predetermined time during which the pockets are inverted by movement of the chains about the sprockets for effecting uniform directional discharge of dough from the pockets.

5. In a dough elevator, the combination of a pair of spaced, endless chains, revolubly mounted sprockets for carrying said chains through an upper and a lower transverse path and an intermediate vertical path, a series of flexible pockets suspended between the chains and adapted to receive lumps of dough and to carry said lumps of dough from a given level to a higher level, and a transverse member at the end of the upper path of the pockets for effecting abnormal flexing of the pockets, whereby lumps of dough are retained in the pockets as said pockets are carried around the endmost pair of sprockets for effecting vertical discharge of the dough from the pockets.

6. In a dough elevator, the combination of an endless series of flexible pockets, means for depositing lumps of dough singly in the pockets, means for moving and directing the pockets to a predetermined elevation, said means including a transverse shaft acting as an abutment in the path of the pockets and serving to effect directional vertical discharge of the dough from the pockets and means for synchronizing the operation of the depositing means and the pocket moving means.

7. In a dough elevating mechanism, the combination of an endless series of flexible pockets, mounted for movement through a transverse loading reach, then through an elevating reach and finally through a discharge reach, means for effecting movement of the pockets, a spacing device for receiving lumps of dough and spacing them, an inclined basket having spaced, grooved fingers at the end thereof for receiving and arresting the lumps of dough from the spacing device, means disposed intermediate said fingers and the loading reach of the pockets for lifting successive lumps of dough from the fingers and depositing them directly into successive pockets, and driving means for effecting synchronized movement of the depositing means and the pockets.

8. In a dough elevator, the combination of an endless series of flexible pockets for receiving lumps of dough, a dough spacing means, and means for picking up single lumps of dough at regular spaced intervals and depositing them directly into successive pockets.

9. In a dough elevator, the combination of an endless series of flexible pockets, means for moving the pockets through a substantially Z-shaped path, a chute for receiving lumps of dough, an endless belt for spacing said lumps of dough from the chute, a basket having slotted fingers for receiving lumps of dough one at a time from said belt and means operating in synchronism with the belt and pockets for lifting single lumps of dough from the basket and depositing them directly into successive pockets.

10. In a device of the class described, the combination of an endless series of pockets arranged for movement through a substantially Z-shaped path, a slotted basket disposed above the lower end of the path of the pockets, means for receiving and positioning lumps of dough and depositing them singly in the basket and means for lifting the lumps one by one from the basket and depositing them in successive pockets.

11. In a device of the class described, the combination of a pair of spaced, endless chains, flat rods connecting the chains at predetermined distances, an endless belt of flexible material turned upon itself at intervals and secured to form sheaths for receiving the rods, the material of the belt between adjacent sheaths forming flexible pockets.

12. In a device of the class described, the combination of a pair of movable, spaced, endless chains, flat rods secured at their opposite ends to said chains and presenting their edges in the plane of movement of the chains, an endless belt and spaced, integral sheaths extending transversely of the belt and receiving therein the flat rods, whereby the belt is developed into a series of flexible pockets supported one between each pair of adjacent rods, and retaining them on a given side of the chains.

In testimony whereof, I have hereunto subscribed my name this 25th day of August, 1926.

SIGMUND SCHIFF.